(12) United States Patent
Everaert (10) Patent No.: US 11,608,157 B2
(45) Date of Patent: Mar. 21, 2023

(54) SLAT FOR AN AIRCRAFT WING AND METHOD FOR MAKING THE SAME

(71) Applicant: Asco Industries NV, Zaventem (BE)

(72) Inventor: Bob Armand Henri Everaert, Ghent (BE)

(73) Assignee: Asco Industries NV, Zaventem (BE)

( * ) Notice: Subject to any disclaimer, the term of this patent is extended or adjusted under 35 U.S.C. 154(b) by 185 days.

(21) Appl. No.: 16/746,268

(22) Filed: Jan. 17, 2020

(65) Prior Publication Data

US 2020/0231271 A1 Jul. 23, 2020

(30) Foreign Application Priority Data

Jan. 18, 2019 (EP) .................................... 19152669

(51) Int. Cl.
| | |
|---|---|
| *B64C 9/24* | (2006.01) |
| *B64F 5/10* | (2017.01) |
| *B64C 3/18* | (2006.01) |
| *B64C 3/26* | (2006.01) |

(52) U.S. Cl.
CPC .............. *B64C 9/24* (2013.01); *B64C 3/185* (2013.01); *B64C 3/187* (2013.01); *B64C 3/26* (2013.01); *B64F 5/10* (2017.01)

(58) Field of Classification Search
CPC .... B64C 9/22; B64C 9/24; B64C 9/26; B64C 3/26
See application file for complete search history.

(56) References Cited

U.S. PATENT DOCUMENTS

| | | | |
|---|---|---|---|
| 8,925,870 B1* | 1/2015 | Gordon | ..................... B64C 3/28 244/214 |
| 2008/0237401 A1 | 10/2008 | Overbergh | |
| 2009/0228134 A1* | 9/2009 | Munk | ..................... B64F 5/10 700/167 |
| 2014/0138481 A1* | 5/2014 | Sakota | ..................... B64C 9/24 244/99.3 |
| 2014/0166818 A1 | 6/2014 | Tanaka | |

FOREIGN PATENT DOCUMENTS

| | | |
|---|---|---|
| EP | 0230684 A1 | 8/1987 |
| WO | WO 2006/010699 | 2/2006 |
| WO | WO 2008/082437 | 7/2008 |
| WO | WO 2018/005529 | 1/2018 |

OTHER PUBLICATIONS

European Search Report from EP App No. 19152669.8 dated Jun. 7, 2019.

* cited by examiner

*Primary Examiner* — Timothy D Collins
*Assistant Examiner* — Eric Acosta
(74) *Attorney, Agent, or Firm* — Adsero IP (57) ABSTRACT

Method for assembling a slat, for an aircraft wing, comprising providing a skin and a plurality of stiffeners; assembling the stiffeners to the skin obtaining a skin sub-assembly; providing a spar and a plurality of lugs; assembling the lugs to the spar obtaining a spar sub-assembly; assembling the spar sub-assembly to the skin sub-assembly to obtain the slat.

15 Claims, 6 Drawing Sheets

SLAT FOR AN AIRCRAFT WING AND METHOD FOR MAKING THE SAME

RELATED APPLICATIONS

This application claims priority to European Application No. 19152669.8, filed Jan. 18, 2019, which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosure relates to a slat for an aircraft wing.

BACKGROUND

A slat is well known and is, in use, attached to a leading edge of an aircraft wing, and is adjustable with respect to that wing between a retracted position and a deployed position. The slat is provided to an aircraft wing in order to improve the aerodynamic lift characteristics of the wing, in particular during low speed operations. The slat, or leading-edge high lift device, can be moved to the deployed position to improve lift characteristics. An actuation system is provided to adjust the slat between the retracted position and the deployed position, or if applicable, to an intermediate position.

Various slat designs are known, by example as described in EP 0 230 684 or US 2008/237401. It is known to manufacture slats using metal alloys components, typically aluminum. Assembly of the numerous metallic, often complex, components is done by metal to metal connections, usually mechanical connections. An example of such a slat is described in US 2014/166818. The assembly of all these metallic components is often burdensome and takes a lot of time. Alternatively, composite slat designs are described, for example in WO 2008/082437. However, such designs are often not turned into practice due to the relatively high manufacturing costs in view of material costs and/or complexity of the components etc. Also, it often appears that reaching a significant weight reduction with a composite slat is rather difficult. Also, it turns out that some designs, in particular of composite slats, cannot be made sufficiently stiff and strong to withstand the relatively high loads of some load cases, such as a bird strike.

There remains a need to provide a slat design that is relatively cost effective in terms of material costs as well as manufacturing costs, and can fulfill the strength and stiffness requirements.

The present invention is directed toward overcoming one or more of the problems discussed above.

SUMMARY OF THE EMBODIMENTS

A method for assembling a slat is provided according to claim 1, and a slat according to claim 6 is provided.

By providing a slat design, of which the skin is reinforced with stiffeners and a spar is upright connected to the skin, the skin with stiffeners acts as the aerodynamic fairing and the spar is the load bearing component of the slat. The slat design is thus spar-based, instead of the common rib-based slat designs. By way of example, metallic slats comprising a load bearing skin and ribs aft of the skin are common in the aircraft industry. The ribs extend in a direction transverse to a chord line of the slat. A front part of the rib is shaped to correspond with the shape of the skin and is connected to an inner side of the skin. A rear part of the ribs is usually tapered towards its rear end. A back cover can be provided to close the rear part of the slat for aerodynamic purposes. The skin together with the ribs are load bearing in such a slat design. The actuation system is often connected to two or more ribs, or one or more ribs may be modified to mate with the actuation system. The present slat concept has a load bearing component, namely the spar, and has an aerodynamic cover or fairing for aerodynamic purposes to generate aerodynamic forces. The main load bearing component is the spar, and not the skin, allowing the skin to be made relatively thin. According to an aspect, the skin is thinner than a conventional load bearing skin.

The stiffeners can be of a relatively simple design as well, as they only need to reinforce the skin for transferring the pressure loading on the slat surface to the main structure of the slat. The skin is in fact a fairing for generating aerodynamic loads. For other load cases, such as bird strikes, actuation load is carried by the load bearing spar and from there on transferred via the actuation system to the main wing. Lugs are connected to the spar for connection of the actuation system thereto.

As such, the skin and the stiffeners can be assembled to a skin sub-assembly, and the spar with the lugs can be assembled to a spar sub-assembly as well. Both sub-assemblies can be assembled in parallel, thus reducing manufacturing time. Then, the spar sub-assembly and the skin sub-assembly can be assembled together to obtain the slat. So in rather few steps, the slat can be assembled. According to an aspect, the spar can be connected to the skin in an upright position, resulting in a closed cell between the skin and the spar. Contrary to conventional designs, this closed cell does not contain any structural elements apart from the stiffeners for the skin. No extra ribs need to be provided; also it is not filled with any filler material such as foam or honeycomb or the like. In fact, apart from the stiffeners for the skin, this cell is empty. The slat is thus of a monolithic structure.

Also, by providing a load bearing spar, and a skin as aerodynamic fairing, the slat does not need to contain any structural elements apart from the stiffeners for the skin. No extra ribs need to be provided; also it is a conventional rib-based metallic slat design but with a more effective assembly cycle.

The skin can be made from metal, e.g. aluminum alloy, or from a composite material, such as glass fiber reinforced plastic material or another plastics material. The stiffeners can be metal or composite as well. Aluminum stiffeners can be mechanically fastened to the skin, or can be welded, e.g. by laser beam welding, to the skin. Composite stiffeners can be co-cured to a composite skin or can be mechanically fastened to a composite or metal skin, or can be chemically bonded, e.g. via an adhesive, to a metal or a composite skin. Welding, e.g. laser beam welding, of stiffeners to the skin may be faster than conventional mechanical fastening, because the welding can be done in one go. In conventional mechanical fastening, first holes need to be made and thereafter the fastening element, e.g. rivet or bolt, must be inserted through the hole and fastened. Also, welding may provide for a smoother outer surface because heads of the fastening elements are absent. According to an aspect, the stiffeners are of a relatively simple design. The cross-section of a stiffener can be L-shaped or I-shaped, or Omega-shaped, or blade-shaped, or T-shaped etc. According to an aspect, the shape of the stiffener is then obtained by sweeping such a cross-sectional shape along a line having a same curvature as the skin, wherein the line is in a two-dimensional plane. Thus, a relatively simple shape is obtained, absent complex three-dimensional curvatures etc. Such a shape shows a curvature in a side view and straight lines in a front view or a top view. A stiffener of such a shape may even be manufactured from a metal sheet, or can relatively simply be manufactured from a composite material with known manufacturing methods, such as tape laying or braiding or filament winding etc.

According to an aspect, the spar is of a metallic material, e.g. of an aluminum alloy. The lugs are metallic components that can be mechanically fastened or welded to the spar to provide for a solid connection and load dissipation.

A slat for an aircraft wing is provided of which the skin is reinforced with material stiffeners. The slat further is provided with a spar extending between an upper and a lower part of the skin, and provided with connection elements for connection to the actuation system. According to an aspect, the connection elements can be lugs.

By providing a slat having a skin reinforced with stiffeners, and a spar, a relatively easy to manufacture slat that can withstand high loads such as bird strike loads can be obtained. A relatively limited number of components is thus required to manufacture the slat. Any kind of composite or metal material is possible, but a glass fiber reinforced material or an aluminum alloy is preferred since it is a relatively cost-effective material that is relatively easy to use in manufacturing. When the skin is a metal skin, it may for example be manufacturing from a metal sheet, e.g. by bending the metal sheet in the desired shape. The spar provides for a load bearing structure ensuring that the slat can withstand relatively high impact loads, such as bird strike loads. In particular, in case of a bird strike, the skin may allowed to fail, but the spar can withstand such a load, allowing the slat to fail safely and preventing the slat from getting loose from the aircraft wing, which might be a potentially dangerous situation. The spar typically is of an aluminum alloy. Furthermore, the spar as a load bearing structure provides for an effective and efficient load introduction and load dissipation structure. The actuation system is, via the lugs, connected to the spar, such that loads on the slat are transferred or dissipated to the main wing via the load bearing structure of the spar, the lugs and the actuation system. As such, load introduction and load dissipation is more effective via the spar than via the skin, allowing a lighter and less complex structure. Known slat designs are typically rib-based design with the skin and the ribs together forming the load bearing structure.

According to an aspect, the stiffeners extend over the inner surface from the lower skin part to the upper skin part, and as such, may provide reinforcement over almost the complete skin area. As such, in a relatively simple manner, a relatively stiff skin can be provided.

According to an aspect, the stiffeners are from the same composite material as the skin, if composite, and can then be co-cured to the skin. Since the skin and the stiffeners can be co-cured, the aerodynamic part of the slat body can be fabricated in a single step. This may reduce the number of manufacturing steps and thus the manufacturing time and manufacturing costs. According to an aspect, the stiffeners can be metal, and connected to a metal skin, or the stiffeners can be composite and connected to a metal skin, or the stiffeners can be metal connected to a composite skin.

According to an aspect, the spar has at an upper end and cutouts allowing the stiffeners to extend there through. By providing the cutouts, the spar can still extend between the upper skin part and the lower skin part without having to interfere with the stiffeners, in particular at the upper skin part. The spar typically can be attached to the lower skin part aft of the stiffeners. However, if spar is to be connected at the lower skin part over the stiffeners, here too, cutouts can be provided in order to avoid interference of the spar with the stiffeners.

According to an aspect, the spar comprises a spar body and flanges. The flanges are provided at an upper end and at a lower end of the spar body and extend in a direction away from the leading edge of the slat. The flanges are arranged to mate with the upper skin part and the lower skin part respectively and can be used for connecting the spar to the respective upper skin part and lower skin part. According to an aspect, the spar is mechanically connected to the skin via the flanges, for example mechanical fastening, such as riveting or bolting, or welding the flanges to the skin. According to an aspect, the flanges may be connected to the skin by using an adhesive or other means.

According to an aspect, the spar body extends in a XY-plane, meaning that the spar body is substantially flat. In particular it can be a substantially flat plate. By providing a substantially flat plate as a spar body, the costs for this component is relatively limited as no complex operations or manufacturing steps are needed to fabricate the spar body. As such, this additionally limits the material costs, while effectively providing for a sufficiently stiff and strong component. The spar body may then be easily be machined out of a metal sheet or a metal plate, which may significantly reduce manufacturing and material costs as compared to double curved or otherwise complex shaped spar design.

Further, the upper skin part may be provided with a metallic or composite trailing edge profile at its trailing edge. According to an aspect, the metallic or composite trailing edge can be made from aluminum or a thermoplastic or a fiber reinforced material. The trailing edge profile extends over the spanwise length of the trailing edge of the upper skin part, to protect the upper skin part from e.g. abrasion, wear or other damage. The trailing edge profile can be assembled together with a rear cover covering a rear side of the slat body. The rear cover is typically a composite material or sheet metal panel and provides for closing of the slat body for aerodynamic purposes. According to an aspect, the trailing edge profile is added to the upper skin part after assembly of the slat. However, when the trailing edge profile is a fiber reinforced profile it may also be co-cured to a composite skin.

The slat may further comprise end plates closing off the slat body at both ends as seen in spanwise direction. Such end plates improve the aerodynamic performance of the slat, and also minimize or reduce the ingress of dirt, water etc. The end plates may be mounted to the slat, after the assembly of the slat from the skin sub-assembly and the spar sub-assembly. Also, after the assembly of the slat, further add-ons may be mounted to the slat, such as an erosion shielding, or a de-icing sheet, or a pressure sealing, or a lighting shielding etc.

Due to the rather limited number of assembly steps and the relatively simple shaped components, the manufacturing and/or assembly is simplified and more efficient, thereby reducing costs. Costs are further reduced due to the use of simpler tools for manufacturing and/or assembly.

Further advantageous embodiments are represented in the dependent claims.

The disclosure will further be elucidated on the basis of exemplary embodiments which are represented in a drawing. The exemplary embodiments are given by way of non-limitative illustration. It is noted that the figures are only schematic representations of embodiments of the disclosure that are given by way of non-limiting example.

According to an aspect, a slat for an aircraft wing is disclosed. The slat comprises a skin wherein an outer surface of the skin forms an aerodynamic surface of the slat body and wherein the skin comprises an upper skin part and a lower skin part extending continuously from a leading edge of the skin such that the upper skin part extends further than the lower skin part seen in a direction along a chord line of the slat. A plurality of stiffeners are assembled to an inner surface of the skin. A spar extends between the upper skin part and the lower skin part and is connected to the upper skin part and the lower skin part. The spar is provided with lugs for connection to an actuation system.

The skin and stiffeners are assembled to form a skin sub-assembly, and the spar and lugs are assembled to form a spar sub-assembly, separate from the skin sub-assembly. The skin sub-assembly and the spar sub-assembly are then combined to form the slat. The skin sub-assembly is manufactured separate from and independent from the spar sub-assembly. They can e.g. be made simultaneously, or in parallel, on separate production lines. When the skin sub-assembly is manufactured, and, separate therefrom, the spar sub-assembly is manufactured, they both are combined together and assembled to form the slat. The skin sub-assembly can be a co-cured sub-assembly of the skin with the stiffeners. In the spar sub-assembly, the lugs are typically mechanically fastened to the spar. The skin sub-assembly can be mechanically fastened to the spar sub-assembly to form the slat.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
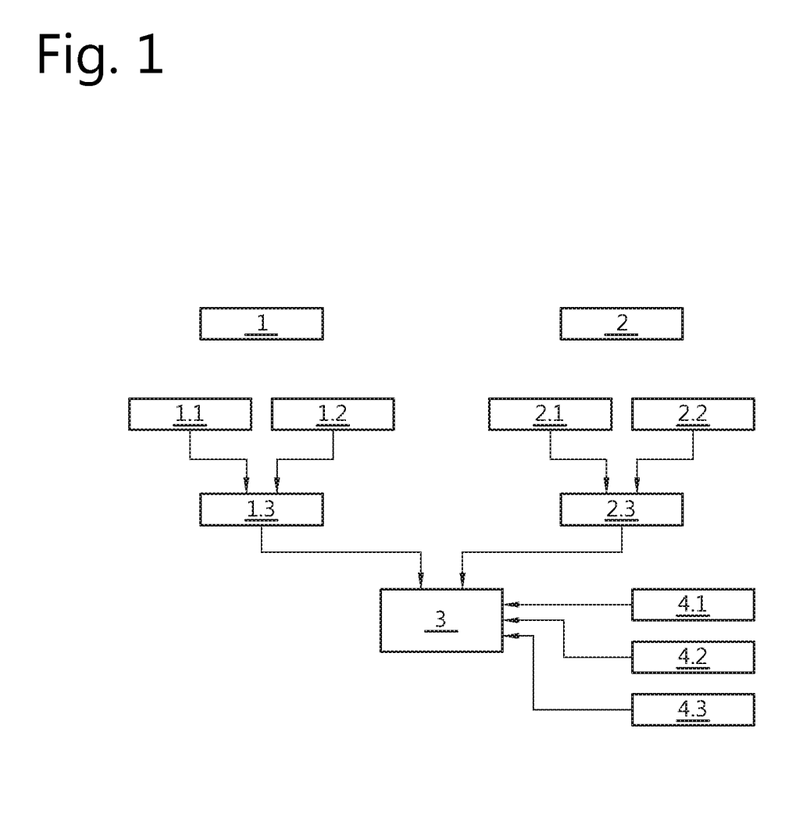
FIG. 1 shows a schematic flow chart of the steps of a manufacturing method according to an embodiment of the disclosure.

FIG. 1 shows a flow chart of the method for assembling a slat according an embodiment of the disclosure. The flow chart has a first step 1 for manufacturing the skin sub-assembly and a second step 2 for assembling the spar sub-assembly. Step 1 and step 2 can be executed in parallel or in series. In step 1.1. of step 1, the skin shell is provided. The skin shell can be of a composite material or of a metallic material. In step 1.2. of step 1, the skin stiffeners are provided, which can be of a composite material or of a metallic material as well. In step 1.3, the skin sub-assembly is manufactured by assembling the stiffeners to the skin. In case of a composite material of skin and stiffeners, the stiffeners may be co-cured to the skin as wet preforms or as dry preforms with resin injection or infusion, or by welding of thermoplastic material or by bonding etc.; mechanical fastening is also possible. When the skin and/or the stiffeners are metallic, mechanical joining, e.g. riveting, is possible or welding or bonding as well. The skin sub-assembly is the fairing component of the slat, providing for the aerodynamic surface for generating aerodynamic loads.

In step 2, step 2.1. the spar is provided that can be made of a composite or of a metallic material. In step 2.2 of step 2, the spar interfaces are provided, being the lugs or connection elements for connection to the actuation system. The lugs or connection elements can be of a composite or metallic material as well. In step 2.3 of step 2, the spar sub-assembly is manufactured by assembling the connection elements to the spar, thus creating the load bearing sub-assembly of the slat. The connection elements and the spar can be assembled together by known assembling techniques, such as co-curing of wet preforms or of dry preforms with resin injection/infusion or of welding of thermoplastics or of mechanical joining or by bonding etc. for composite and/or metallic material. When the spar and/or the connection elements are metallic, mechanical joining is possible or welding or bonding etc.

In step 3 of the method, the skin sub-assembly and the spar sub-assembly are connected together to form a slat. The slat assembly can be an all composite slat assembly, e.g. when the skin sub-assembly and the spar sub-assembly are all composite. The slat assembly can be a hybrid slat assembly as well, e.g. when the skin sub-assembly is composite and the spar sub-assembly is metallic or vice versa. Also, the skin sub-assembly can be hybrid, partly composite partly metallic, e.g. the skin may be composite and the stiffeners may be metallic or vice versa. Also, the spar sub-assembly can be hybrid, partly composite, partly metallic, e.g. the spar can be composite and the lugs or connection elements can be metallic or vice versa. Further, the slat assembly can be all metallic. The spar sub-assembly can be joined to the skin sub-assembly by mechanical joining, welding or bonding or another joining technique.

In steps 4.1, 4.2, 4.3 additional components may be mounted to the slat, such as a rear cover in step 4.1 covering a rear side of the slat for aerodynamic purposes. In step 4.2. a trailing edge profile may be added to the trailing edge of the skin upper part. The rear cover and the trailing edge profile may be of a composite material or of a metallic material. In step 4.3. equipment may be added to the slat, such as pressure seals, de-icing if applicable, erosion shielding if applicable, a lightning shielding if applicable etc. So, in a rather limited number of steps, some of which—step 1 and step 2—can even be done in parallel, a complete slat assembly can be manufactured, which may significantly reduce the manufacturing time, as well as the complexity of the separate assembly operations and assembly tools/jigs for these operations.

Figure 2:
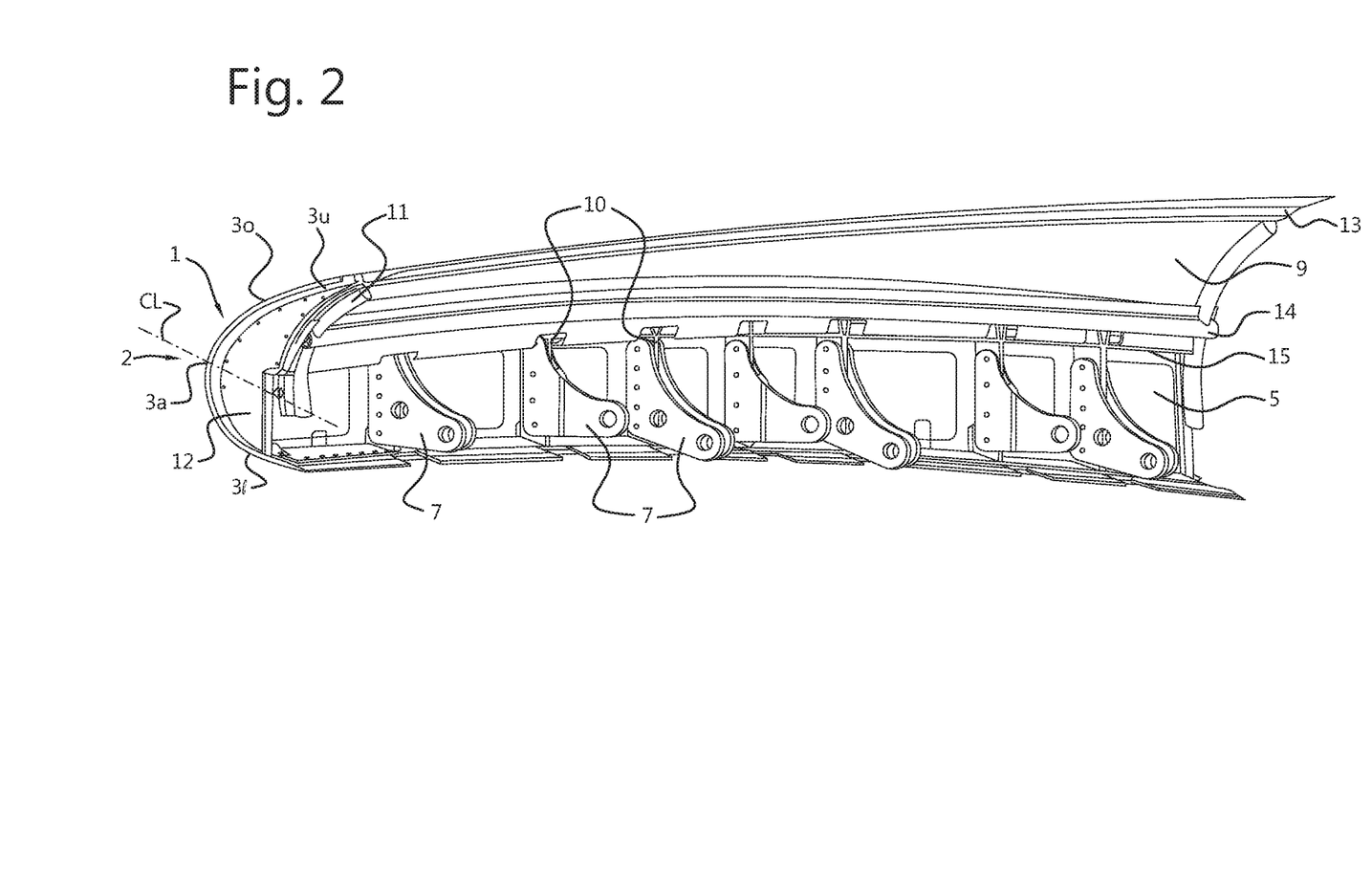
FIG. 2 shows a schematic perspective view of a fully assembled slat according to an embodiment of the disclosure.

FIG. 2 shows a schematic perspective view of a slat 1 when fully assembled. The slat 1 comprises a slat sub-assembly 2 having a shell 3 reinforced with stiffeners 4. The shell 3 is a skin 3 made from composite material or from a metallic material. The material can be a glass fiber reinforced composite material (GFRP), as this is a relatively common material, relatively cost effective and can relatively easily be processed. However, other materials may be possible as well, such as carbon fiber reinforced plastics or aluminum alloy. An aluminum alloy skin may be lighter or weight neutral compared to a composite skin. The skin 3 has an outer surface 3o that forms an aerodynamic surface of the slat 1. The skin 3 may further be provided with heating material, or a heating mat or other de-icing elements, lightning elements etc. Also, the outer surface 3o of the skin 3 may be provided with an anti-abrasive layer or coating. The skin 3 may be manufactured in a common way, e.g. by tape laying, fiber placement, braiding, filament winding etc. or may be manufactured otherwise, manually or automated.

The skin 3 is a single piece element that has an upper skin part 3u and a lower skin part 3l that extend continuously from a leading edge 3a of the skin. As such it forms the complete aerodynamic outer surface of the slat in a single piece. No connections between the upper skin part 3u or the lower skin part 3l are needed, since they are manufactured as a single skin. The leading edge 3a of the skin 3 can be considered as the most forward region or edge of the skin 3 seen along a chord line CL of the slat body 2 in a direction opposite the normal flight direction, so from leading to trailing edge. The trailing edge of the slat sub-assembly 2 is typically the most aft region or edge of the slat sub-assembly 2, seen along the chord line CL in the same direction.

According to an aspect, the upper skin part 3u extends further than the lower skin part 3l along the chord line CL. So, starting from the leading edge 3a and along the direction of the chord line CL, the lower skin part 3l is thus shorter than the upper skin part 3u. This has major aerodynamic advantages, as when the slat 1 is adjusted to the deployed position, the upper skin part 3u may be in line with the main wing body to which the slat 1 is attached. Below the upper skin part 3u there may be some space for e.g. an actuation mechanism.

Figure 3:
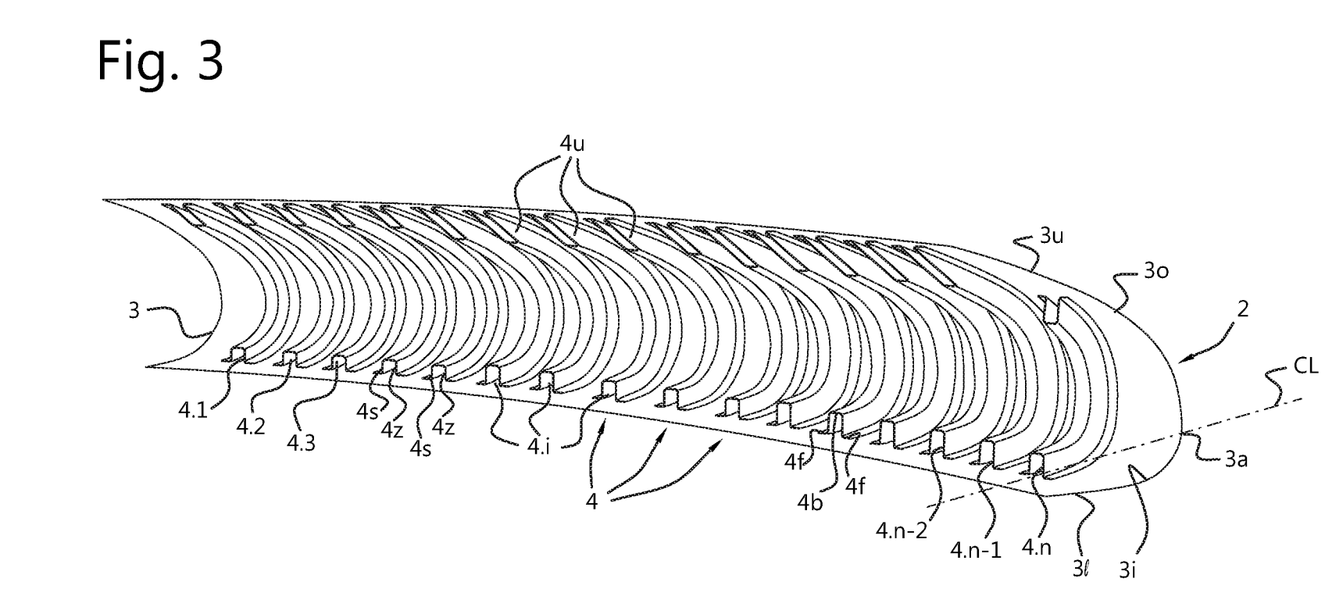
FIG. 3 shows a schematic perspective view on the skin with the stiffeners of the slat.

The shell or skin 3 has an outer surface 3o, that forms the aerodynamic surface of the skin 3, and has an inner surface 3i, that faces an inside of the slat body 2. Referring to FIG. 3, a plurality of stiffeners 4 are provided that are connected to the inner surface 3i of the skin 3 by means of co-curing. The stiffeners 4 can be composite material components or can be metallic stiffeners. According to an aspect, the composite stiffeners 4 can be GFRP stiffeners 4. According to an aspect, the stiffeners 4 are all of the same design and shape, for example omega-shaped, or T-shaped, or I-shaped, etc. All of the stiffeners 4 may be of the same size, or may be scaled such that larger stiffeners 4 can be used at regions of the slat where the loads are higher and more reinforcement may be required. For example, in the embodiment of FIG. 3, it can be seen that the more inner positioned stiffeners 4.1, 4.2, 4.3 etc. are smaller than the more outer positioned stiffeners 4.n, 4.n-1, 4.n-2 etc, but do have the same design. According to an aspect, all stiffeners 4.i may have the same size and design. The stiffeners 4 extend over the whole inner surface 3i of the skin 3, from the lower skin part 3l up to the upper skin part 3u, to provide optimal reinforcement.

The stiffeners 4 typically have a stiffener body 4b with flanges thereto. The stiffeners 4 may have a U-shaped body as for example seen in FIG. 3. The flanges of the omega-shape are not visible in this figure as co-cured to the skin 3, and thus become one with the skin 3. The body of the stiffeners 4 can be empty, but may be filled with a filler material, such as foam, as well. The upper ends 4u of the stiffeners 4 are in this embodiment somewhat reduced in size in a triangular fashion. Other shapes of stiffener ends 4u may be possible, e.g. a simple straight end, as shown here for the lower end 4l is possible as well. The thickness of the stiffener may vary per stiffener. For example, a larger sized stiffener 4 may be thicker. According to an aspect, the stiffener 4 is shaped two-dimensionally, meaning that, a front view or a rear view of the stiffener 4 shows a straight profile, whereas a side view shows an approximately C-shaped profile following the curvature of the skin 3. For example, when the body 4b of the stiffener 4 is U-shaped in cross-section, the sides 4s, 4z of the U are in planes parallel to each other. Also when the shape of the body is not U-shaped, or the omega-shape has inclined walls, the front view or the rear view can show a straight profile. Such a relatively simple design stiffener may be obtained by providing a cross-section and sweeping the cross-section shape along a line curved in the shape of the skin but extending in a plane. By providing such a simple design stiffeners, having a less complex shape, fabricating of such a plurality of stiffeners can be simplified and/or expedited. Also, less material can be used than required for a stiffener with a complex shape.

The stiffeners 4 are pre-fabricated and then joined to the skin 3. As such, in a single manufacturing step, the reinforced skin sub-assembly is fabricated. The slat 1 further comprises a spar 5 extending between the upper skin part 3u and the lower skin part 3l as well as in spanwise direction over the length of the slat 1. According to an aspect, the spar 5 is flat, as in that the spar extends in a XY-plane. This makes the spar a relatively simple and easy to manufacture component. For example, it may simply be machined out of a sheet of metal. According to an aspect, the spar 5 is fabricated from an aluminum alloy, although other materials may be used, such as a composite material. The spar 5 is connected to the upper skin part 3u and to the lower skin part 3l. According to an aspect, the spar 5 is connected to the upper skin part 3u and to the lower skin part 3l in a mechanical way, e.g. by bolting or riveting. According to an aspect, the spar 5 may be connected to the upper skin part 3u and to the lower skin part 3l in a chemical way, e.g. by adhesives.

Figure 4:
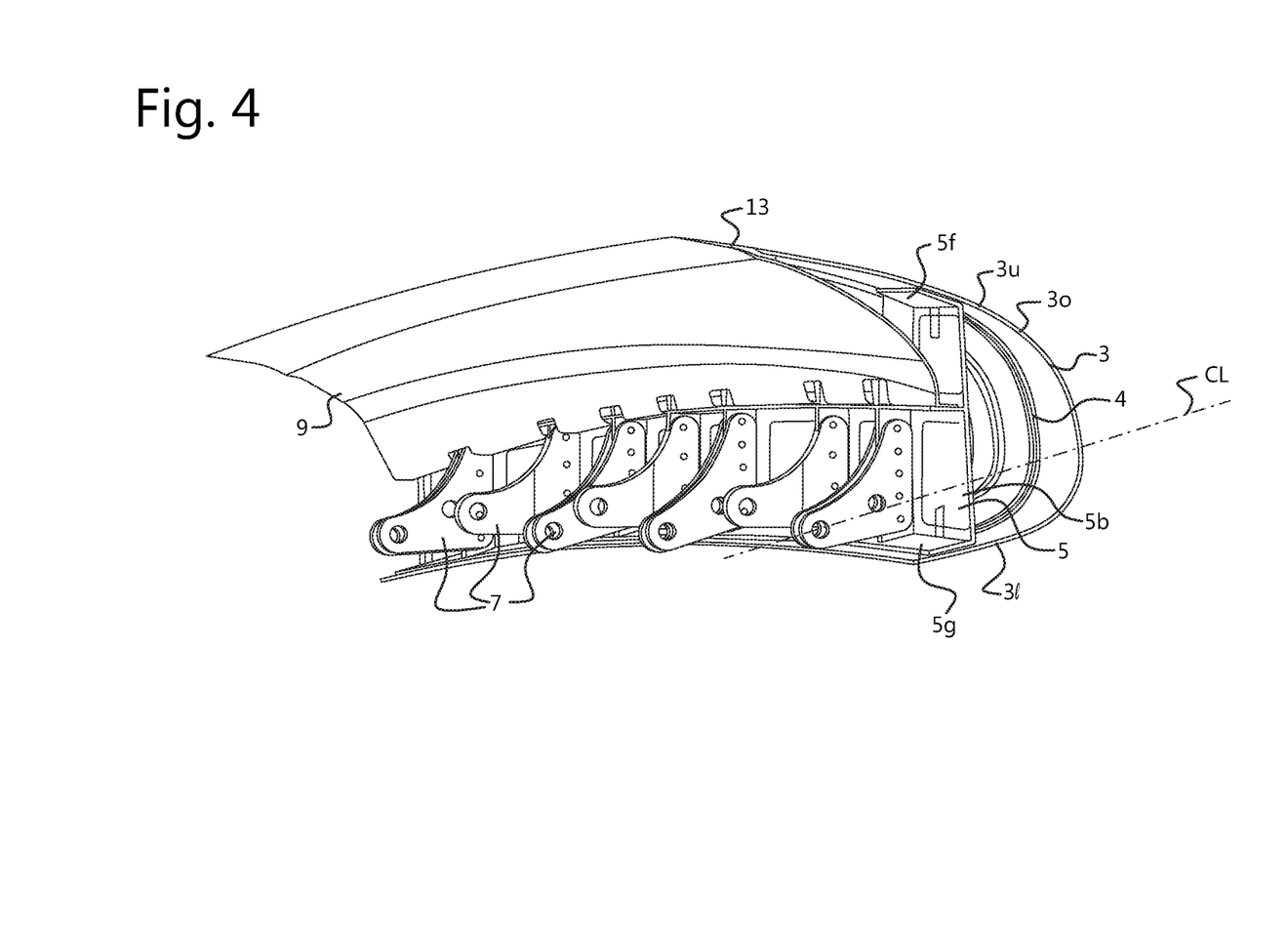
FIG. 4 shows a schematic perspective view of the slat showing the skin, the stiffeners, the spar, the rear cover and the trailing edge profile.

According to an aspect, referring to FIG. 4, the spar 5 has a straight spar body 5b, extending in a plane. According to an aspect, the spar body 5b is provided with flanges 5f and 5g at an upper end and at a lower end respectively, schematically shown in FIG. 4. According to an aspect, these flanges 5f, 5g are shaped correspondingly to the upper skin part 3u and the lower skin part 3l respectively such that they can mate with the upper skin part 3u and the lower skin part 3l. Connection of the spar 5 to the skin 3, can then be done by riveting or bolting or welding or bonding or otherwise joining the flanges 5f, 5g to the associated skin part 3u, 3l. According to an aspect, the flanges 5f, 5g extend both in the same direction with respect to the spar body 5b, such that, when the spar 5 is connected to the skin 3, the flanges 5f, 5g extend rearwardly, towards the trailing edge in a direction away from the leading edge 3a along the chord line CL. As such, the flanges 5f, 5g are accessible for fastening tools when mounting the spar 5 to the skin 3.

Figure 5:
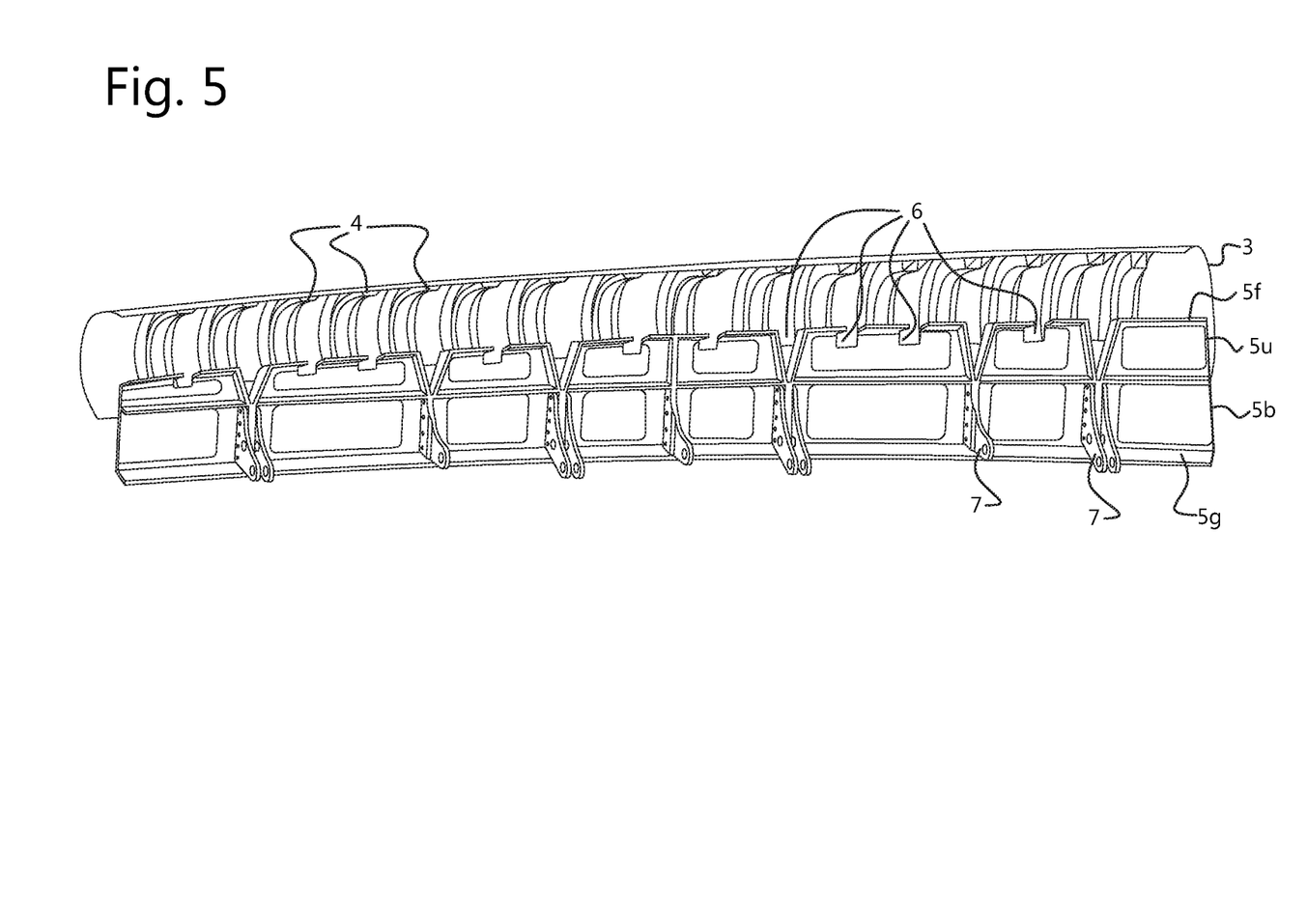
FIG. 5 shows an exploded perspective view of the skin sub-assembly and the spar sub-assembly.

As can be seen in FIG. 5, the spar 5 is at an upper end 5u thereof provided with cut-outs 6 for allowing the stiffeners 4 to pass there through. As such, the spar 5 can be mounted to the skin 3 without interfering with the stiffeners 4. According to an aspect, the cut-outs 6 are just large enough to provide an opening for the stiffeners 4 taking into account deformations, expansions etc. during use.

The spar 5 further is provided with lugs 7 for connection to an actuation system (not shown). The actuation system is at the one end connected to the lugs 7 and at the other end connected to the main wing body and provides for adjustment of the slat 1 with respect to the main wing body between a retracted position and a deployed position, or any position in between. The spar 5 thus provides for a load bearing component of the slat 1 to which the aerodynamic and other loads of the slat are introduced and that can transfer the loads to the main wing body via the lugs 7 and the actuation system. The spar 5 also provides for an effective barrier for bird strike impact. Upon a bird strike, or other impact, the skin 3 may be allowed to fail, however, the spar 5 may then hold the slat 1 to avoid the slat 1 from coming loose from the main wing body. The spar 5 then may receive the impact and its associated loads without failing, thus fulfilling safety requirements.

Figure 6A:
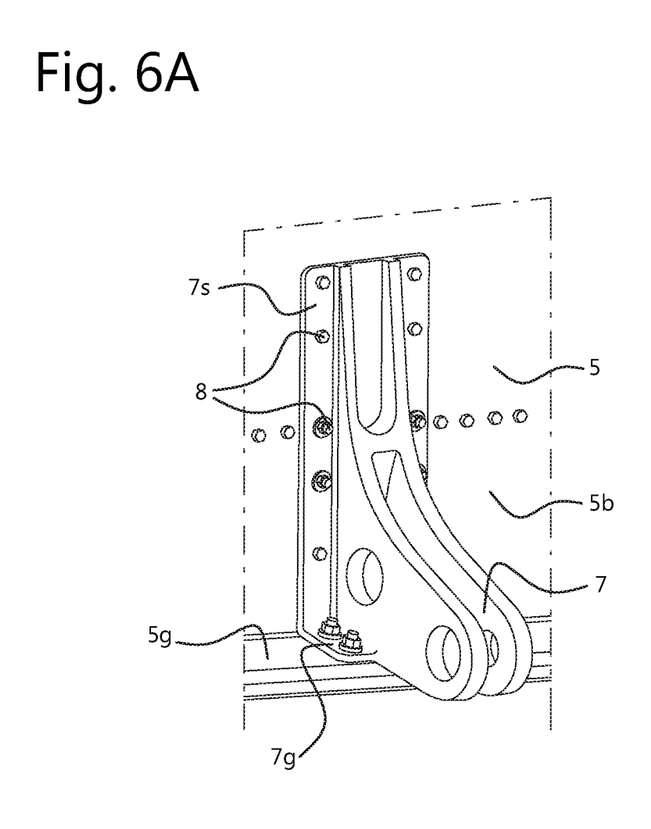
FIGS. 6a and 6b show alternatives of a detail of a lug connected to the spar and for connection to the actuation system.
Figure 6B:
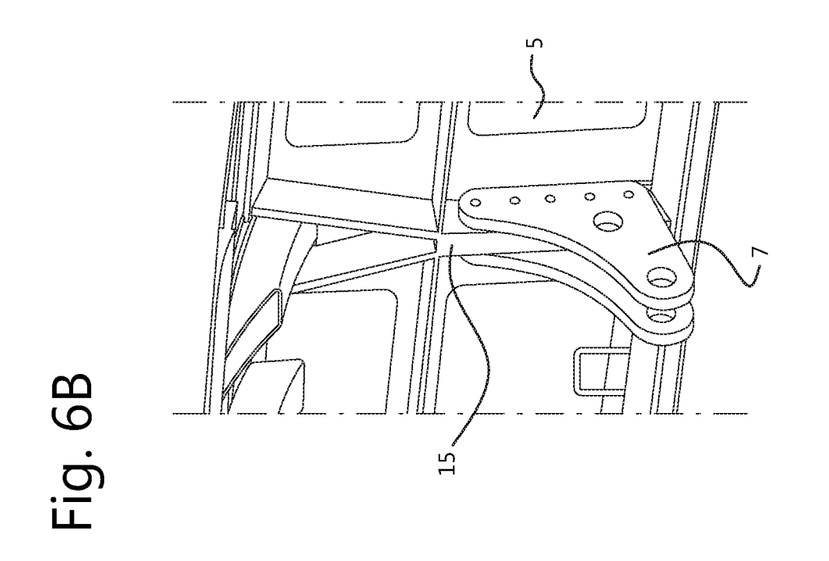

FIGS. 2, 4, 5 show lugs 7 or connection elements 7 in two different variants, but a single lug type may be used as well. The principle of a lug 7 is generally known and will not be elaborated further here. The number of lugs 7 provided to the spar 5 depends also an actual load cases or on the actuation system used. FIG. 6a shows a possible connection of a lug 7 to the spar 5. The lug 7 is thereto provided with a shear plate 7s that is arranged for mating with the spar body 5b. The shear plate 7s also has a flange 7g that is arranged for mating with the flange 5g of the spar 5. The shear plate 7s and the flange 7g are fastened to the spar 5 by means of mechanical fastening means 8, which may be rivets, bolts, tension fasteners and/or shear fasteners. As such, a relatively effective load transfer can be obtained between the spar 5 and the lug 7, and further to the actuation system and main wing. FIG. 6b shows an alternative connection of a lug 7 to the spar 5. Here, the spar 5 is provided with a reinforcement 15 as a stiffener 15 extending transversely to the spar 5. The lug 7 is here connected to the stiffener 15 by mechanical fastening. The lug 7 is in this embodiment of a relatively simple design, and can rather easy be cut out of a metal plate. Of course, the lug 7 can also be made from a composite material.

When joining the spar sub-assembly to the skin sub-assembly, there are no other components than the stiffeners between the skin 3 and the spar 5, as can be seen for example in FIG. 4. The slat 1 is thus a monolithic structure, there are no fillers or honeycomb material or ribs or other materials provided. The absence of fillers or honeycomb is advantageous as water ingress is possible in fillers or honeycomb material which may impair the durability, as well as the weight, of the slat. In such a monolithic slat structure, water ingress can thus be minimized or avoided.

Also shown in FIG. 2 and FIG. 4 is a rear cover 9 that is connected between the spar 5 and the upper skin part 3u for aerodynamically covering the rear side of the slat 1. So, the slat 1 becomes more aerodynamically 'clean'. The rear cover 9 can be a metallic sheet, e.g. from aluminum. The rear cover 9 can be made from a composite material, e.g. from GFRP. The rear cover 9 can be connected to the spar 5 as well as to the upper skin part 3u via mechanical fastening elements, such as rivets or bolts, or can be welded or bonded thereto. Also shown in FIG. 2 and FIG. 4, the rear cover 9 is provided with cut-outs 10 to provide space for the lugs 7 and the corresponding spar stiffeners 15. Between the rear cover 9 and the spar 5 a pressure sealing 11 is provided and the rear cover 9 is also provided with a pressure sealing 14 for sealing with the main wing body in retracted position.

The slat 1 further is closed by closing plate 12 provided at both ends of the slat body as to aerodynamically close the slat body, and also to prevent dirt or grease or water from entering into the slat 1.

The trailing edge of the upper skin part 3u is further provided with a trailing edge profile 13 that is connected to the trailing edge over the entire spanwise length of the slat 1. The trailing edge profile 13 is advantageous for reducing abrasion, wear and/or damage to the trailing edge of the upper skin part 3u.

For the purpose of clarity and a concise description, features are described herein as part of the same or separate embodiments, however, it will be appreciated that the scope of the disclosure may include embodiments having combinations of all or some of the features described. Where aluminum is used, aluminum alloy is not excluded and vice versa.

It may be understood that the embodiments shown have the same or similar components, apart from where they are described as being different. In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the disclosure defined in the following claims.

What is claimed is:

1. A method for assembling a slat, the slat being for connection to an actuation system of an aircraft wing, the actuation system being configured to provide adjustment of the slat with respect to a main wing body of the aircraft wing between a retracted position and a deployed position, the method comprising:
providing a skin and a plurality of stiffeners, the stiffeners in side view having a C-shaped profile;
assembling the stiffeners to an inner surface of the skin obtaining a skin sub-assembly, wherein the C-shaped profile of the stiffeners follows a curvature of the skin so that the stiffeners extend over the inner surface from a lower skin part of the skin to an upper skin part of the skin, the upper skin part and the lower skin part extending continuously from a leading edge of the skin;
providing a spar and a plurality of lugs;
assembling the lugs to the spar obtaining a spar sub-assembly, wherein, as part of the spar sub-assembly, the lugs are configured to provide a connection between the spar and the actuation system for transmission and dissipation of loads on the slat to the aircraft wing via a load bearing structure of the spar, the lugs, and the actuation system;
assembling the spar of the spar sub-assembly to the upper skin part and the lower skin part of the skin of the skin sub-assembly to obtain the slat, so that between the skin and the spar a closed cell is formed which does not contain any structural elements apart from the stiffeners.

2. The method according to claim 1, further comprising: providing separate production lines for assembling the skin sub-assembly and assembling the spar sub-assembly, wherein the skin sub-assembly and the spar sub-assembly can be produced in parallel.

3. The method according to claim 1 wherein the slat is provided with end plates closing off the slat body at both ends as seen in a spanwise direction.

4. The method according to claim 1, further comprising providing a trailing edge profile to an upper end of the skin.

5. The method according to claim 1, further comprising mounting a rear cover to the spar and the skin for covering a rear side of the slat.

6. A slat, for connection to an actuation system of an aircraft wing, the actuation system being configured to provide adjustment of the slat with respect to a main wing body of the aircraft wing between a retracted position and a deployed position, the slat comprising:
a skin sub-assembly comprising:
a skin wherein an outer surface of the skin forms an aerodynamic surface of the slat body, wherein the skin comprises an upper skin part and a lower skin part extending continuously from a leading edge of the skin, to form the complete aerodynamic outer surface of the slat in a single piece, such that the upper skin part extends further than the lower skin part seen in a direction along a chord line of the slat, and
a plurality of stiffeners attached to an inner surface of the skin, the stiffeners in side view having a C-shaped profile which follows a curvature of the skin so that the stiffeners extend over the inner surface from the lower skin part to the upper skin part; and
a spar sub-assembly comprising:
a spar extending between the upper skin part and the lower skin part that is connected to the upper skin part and the lower skin part, so that between the skin and the spar a closed cell is formed which does not contain any structural elements apart from the stiffeners; and
wherein the spar is provided with lugs for connection to the actuation system for transmission and dissipation of loads on the slat to the aircraft wing via a load bearing structure of the spar, the lugs, and the actuation system.

7. The slat according to claim 6, wherein the spar of the spar sub-assembly has cutouts at an upper end thereof for receiving the stiffeners of the spar sub-assembly therethrough.

8. The slat according to claim 6, wherein the spar of the spar sub-assembly comprises a spar body and flanges at an upper end and a lower end of the spar body, wherein the flanges are arranged for mating with the upper skin part and the lower skin part of the skin sub-assembly respectively.

9. The slat according to claim 6, wherein the spar of the spar sub-assembly is mechanically fastened to the skin of the skin sub-assembly.

10. The slat according to claim 6,
wherein a spar body of the spar extends in an XY-plane.

11. The slat according to claim 6, wherein a trailing edge of the upper skin part is provided with a trailing edge profile over the spanwise length of the slat.

12. The slat according to claim 6, further comprising a rear cover covering a rear side of the slat between the spar and the upper skin part.

13. The slat according to claim 6, wherein the lugs are connected to a spar body as well as to a flange mating the lower skin part.

14. The slat according to claim 6, wherein the skin is at least one of a composite material or a metallic material.

15. The slat according to claim 6, wherein the spar is at least one of a metallic material or a composite material.

* * * * *